Dec. 4, 1923.

T. C. DEXTER 1,476,155

PAPER CUTTING MACHINE

Filed Dec. 1, 1921

T. C. Dexter
INVENTOR

BY Cooper, Kerr & Dunham
ATTORNEYS

Dec. 4, 1923.

T. C. DEXTER
PAPER CUTTING MACHINE
Filed Dec. 1, 1921

INVENTOR
T. C. Dexter
BY
Cooper, Kerr & Dunham
ATTORNEYS

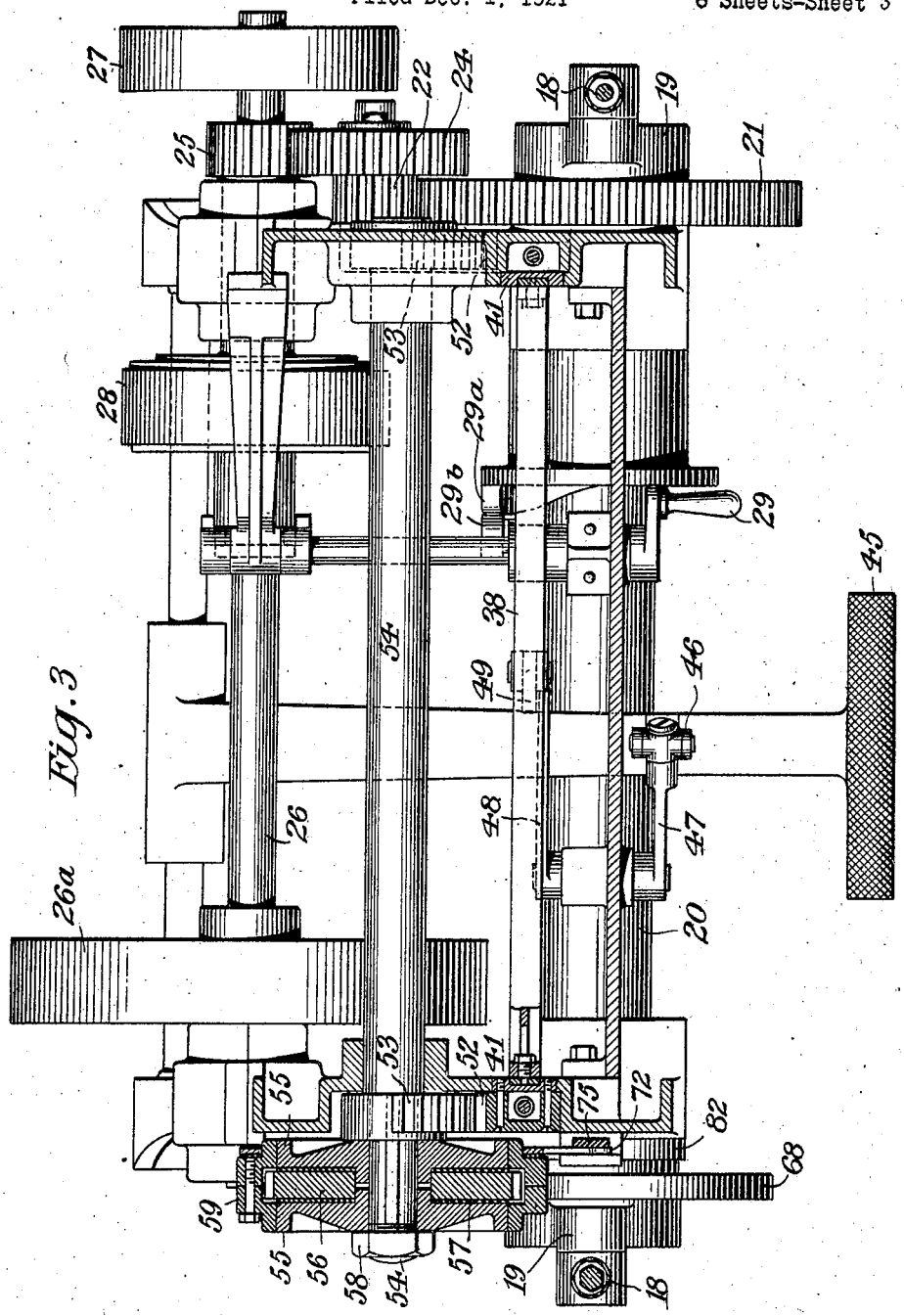

Dec. 4, 1923.

T. C. DEXTER
PAPER CUTTING MACHINE
Filed Dec. 1, 1921

INVENTOR
T. C. Dexter
BY
Cooper, Kerr, & Dunham
ATTORNEYS

Dec. 4, 1923.                                      1,476,155
T. C. DEXTER
PAPER CUTTING MACHINE
Filed Dec. 1, 1921          6 Sheets-Sheet 5

T. C. Dexter
INVENTOR

BY
Cooper, Kerr, & Dunham
ATTORNEYS

Dec. 4, 1923.
T. C. DEXTER
PAPER CUTTING MACHINE
Filed Dec. 1, 1921
1,476,155
6 Sheets-Sheet 6
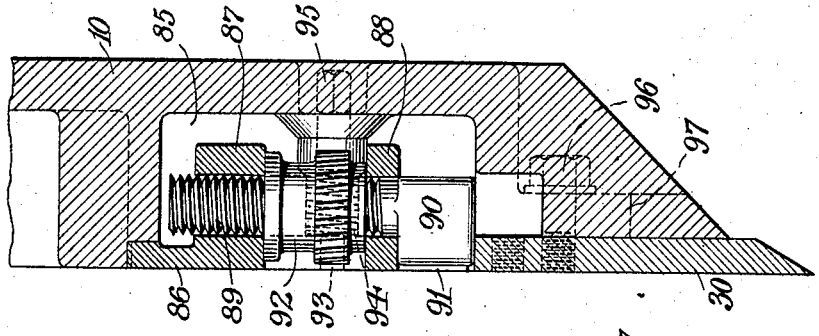
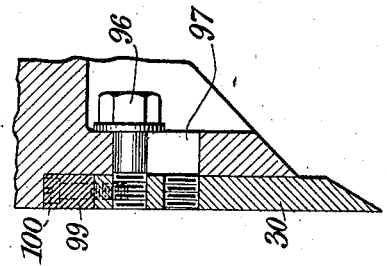
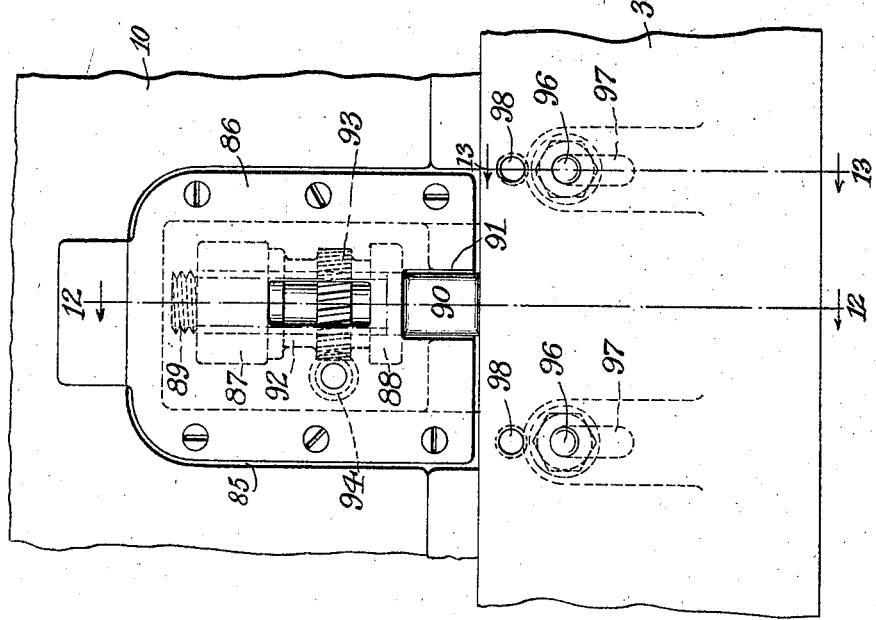
T.C. Dexter
INVENTOR
BY
Cooper, Kerr & Dunham
ATTORNEYS Patented Dec. 4, 1923.

1,476,155

UNITED STATES PATENT OFFICE.

TALBOT C. DEXTER, OF PEARL RIVER, NEW YORK.

PAPER-CUTTING MACHINE.

Application filed December 1, 1921. Serial No. 519,157.

*To all whom it may concern:*

Be it known that I, TALBOT C. DEXTER, a citizen of the United States of America, residing at Pearl River, in the county of Rockland and State of New York, have invented certain new and useful Improvements in Paper-Cutting Machines, of which the following is a full, clear, and exact description.

This invention relates to paper-cutting machines of the so-called guillotine type, particularly those in which the paper, during the cut, is held by a power-actuated clamp, and in which the knife has a horizontal as well as a vertical motion. The chief object of the invention is to provide a machine in which a substantial part of the clamping pressure is supplied by a hitherto wasted part of the driving energy, the remaining portion of the clamping pressure being supplied directly from the driving mechanism through the medium of a friction device or clutch; both portions of the clamping pressure acting continuously and conjointly while the cut is being made, with the result that with the same expenditure of power the machine will give greater pressure on the paper, or, with less expenditure of power, will give a pressure as great as that exerted in prior machines, thus effecting a marked improvement in efficiency. Another object of the invention is to improve the friction device or clutch in the direction of lessened resistance to the return of the clamp and knife after the cut has been made; reduced wear, and more even wear, on the friction parts; and reduced liability of breakage of the friction device and parts thereof, by elimination of stresses tending to spread the device apart. To these and other ends the invention consists in the novel features of construction and combinations of elements hereinafter described.

In carrying out the invention in the preferred manner the paper clamp is carried by the knife and is connected thereto by a stud and inclined slot construction, and the clamp is arranged in guides which permit only a vertical movement while the knife is capable of both horizontal and vertical motion simultaneously. At the same time the clamp is connected to the driving mechanism by means of a friction clutch in such manner that part of the driving energy is exerted directly upon the clamp when the latter is seated on the paper and is exerting pressure thereon due to the action of the stud and inclined slot construction in giving the knife a horizontal component of motion combined with its vertical motion. This latter pressure does not cease, however, while the direct pressure through the friction clutch is being exerted, but continues during the entire cut, so that the total clamping pressure is markedly greater than has heretofore been possible of attainment with equal expenditure of power.

The embodiment outlined above is illustrated in the accompanying drawings, in which—

Fig. 3 is a sectional plan view, about on the line 3—3 of Fig. 1.

Fig. 11 is a detail cross section illustrating one of the mechanisms for adjusting the knife on the knife-stock, taken about on line 11—11 of Fig. 12.

Fig. 12 is a front view of the mechanism shown in Fig. 11.

Fig. 13 is a detail cross section on line 13—13 of Fig. 12.

Figure 1:
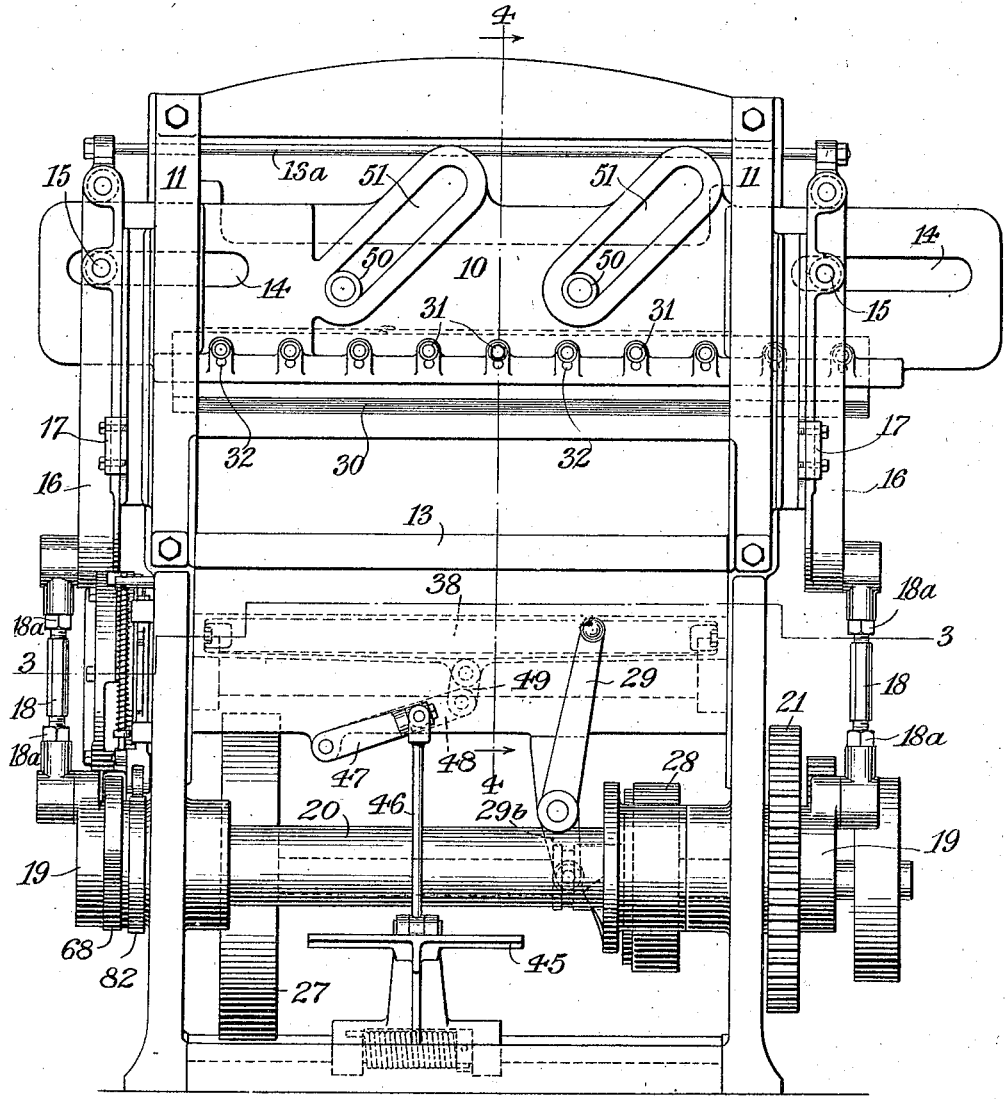
Fig. 1 is a front elevation of the machine, with the knife and clamp in raised position.
Figure 2:
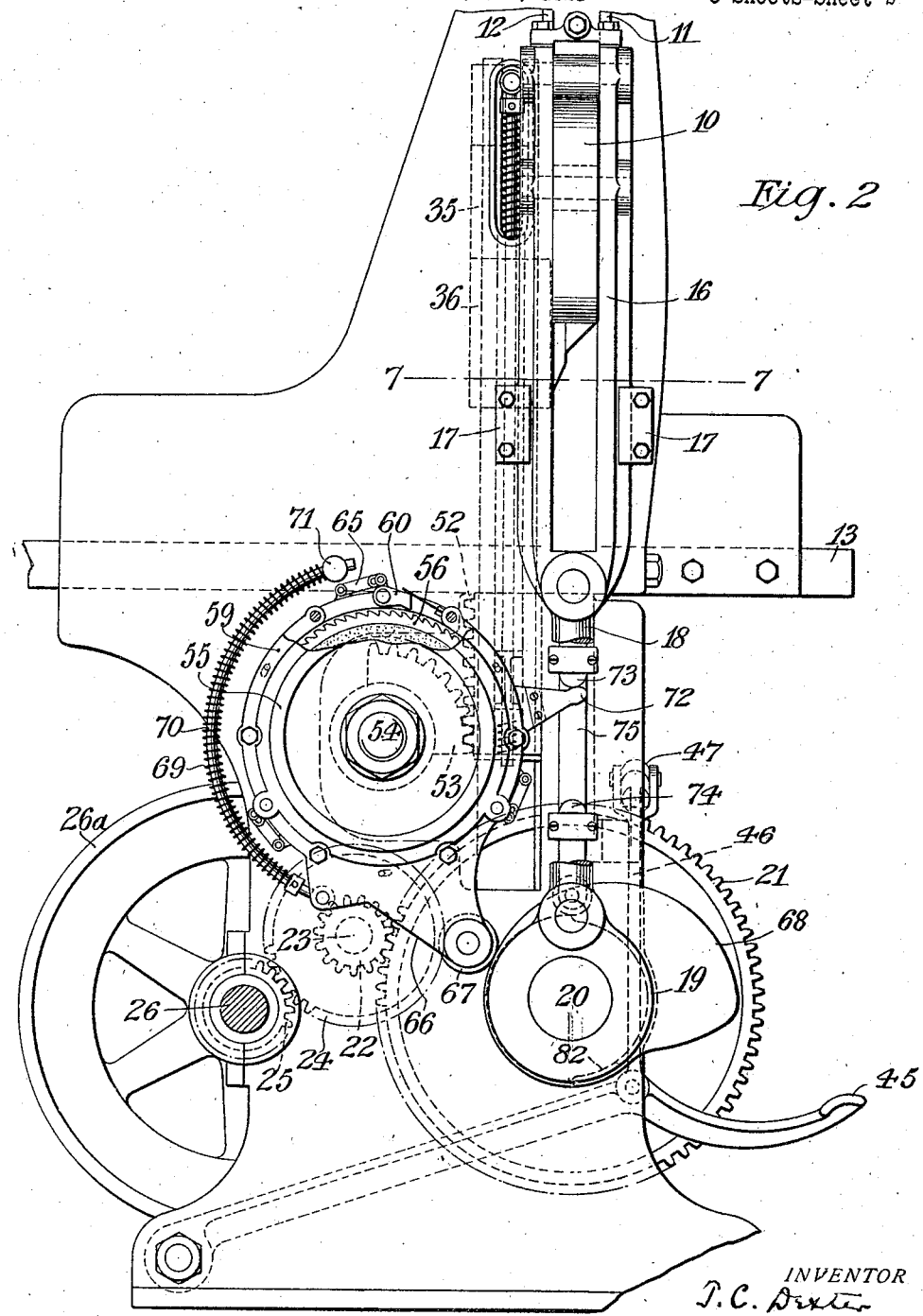
Fig. 2 is a side elevation, from the left of Fig. 1.
Figure 7:
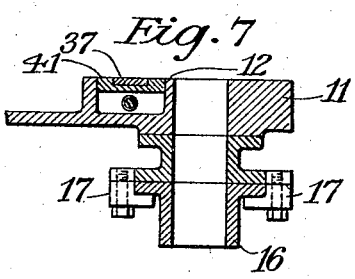
Fig. 7 is a detail section on line 7—7 of Fig. 2.

The knife-stock 10, Figs. 1 and 2, moves vertically and horizontally between front and rear guides 11, 12, at each side of the machine above the bed or table 13, and is provided at its ends with horizontal slots 14 for engagement with the studs 15 carried by the yokes 16, by which the stock is actuated. The yokes move vertically in guides 17, Figs. 1, 2 and 7, and are reciprocated to elevate and depress the knife-stock by means of connecting rods 18 adjustably connected to the yokes and to cranks 19 on the ends of the transverse shaft 20 near the bottom of the machine. For the purpose of adjustment the connecting rods 18 are screwed into the yokes 16 and cranks 19 by means of right and left hand threads, with lock nuts 18ª at each end. This construction makes it easy to raise or lower either or both yokes, for the purpose of accurately positioning the knife-stock. At the top the yokes are connected by a transverse tie-rod 16ª to prevent lateral spreading. The shaft 20 is driven by a gear 21 from a pinion 22, Fig. 2, on shaft 23, which is itself driven by a gear 24 from a pinion 25 on the shaft 26, equipped with a driving pulley 27, Fig. 3. The pinion 25 is on one member of a friction clutch 28, Fig. 1, controlled by a hand-lever 29, Fig. 1, so that the machine may be started and stopped at will although the power shaft 26 is running continuously. The clutch is also disengaged automatically, after each complete cycle of operation of the machine, by means of a face-cam 29ª, Fig. 3, on shaft 20, cooperating with an arm 29ᵇ rigidly connected with the hand lever 29. See also Fig. 1. Shaft 26 may be provided with a flywheel 26ª.

Figure 4:
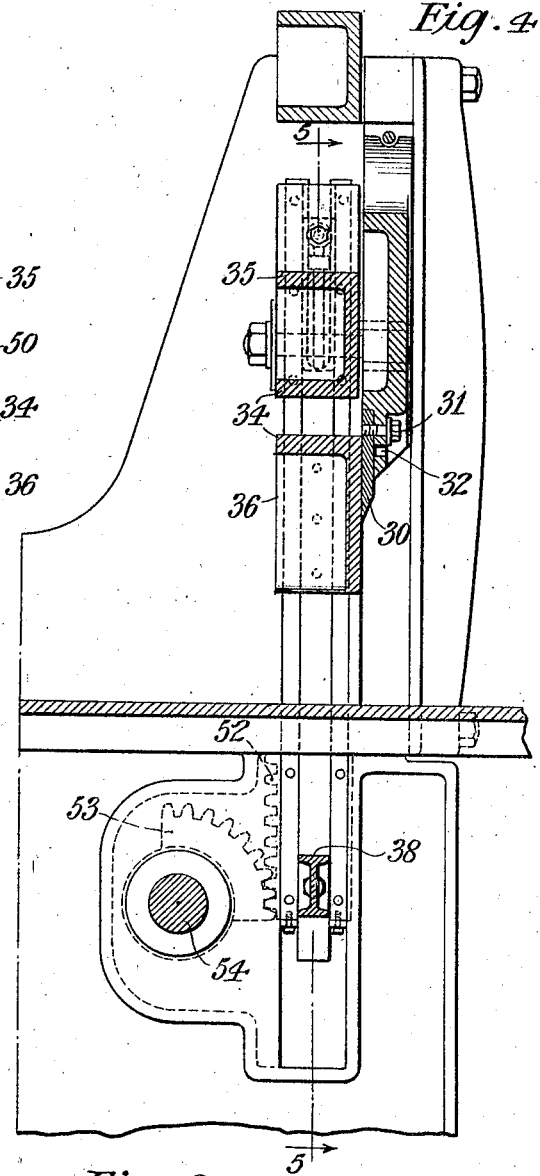
Fig. 4 is a detail section on line 4—4 of Fig. 1.
Figure 6:
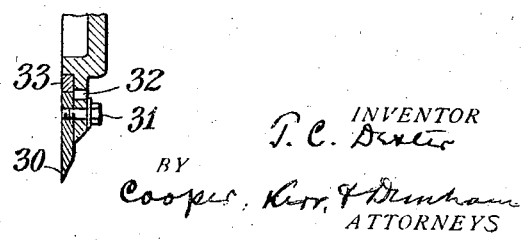
Fig. 6 is a detail section illustrating a convenient method of fastening the knife on the knife-stock.
Figure 9:
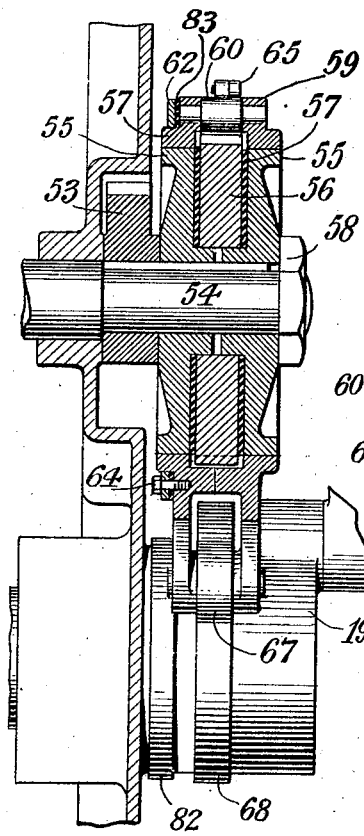
Fig. 9 is a detail section on line 9—9 of Fig. 8.

The knife 30, Figs. 1, 4 and 6, may be fastened to the lower edge of the stock 10 by means of screws 31 extending rearwardly through vertical slots 32. When the knife is new it is set in the position shown in Fig. 4, but when narrowed by repeated sharpening it may be dropped to the position shown in Fig. 6, a strip 33 being inserted to prevent vertical displacement.

Figure 5:
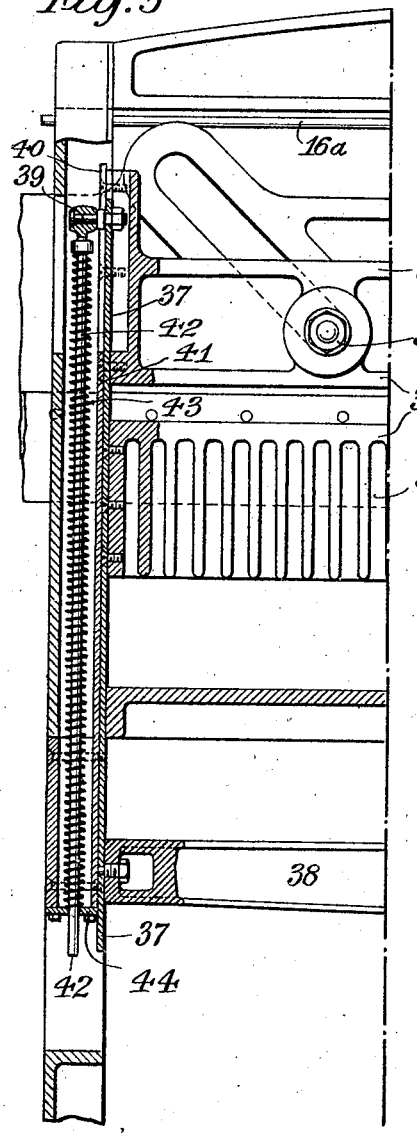
Fig. 5 is a detail section on line 5—5 of Fig. 4.

The clamp 34, Figs. 4 and 5, is composed of an upper part 35 and a lower part 36. The latter is connected at its ends to a pair of vertical slides, one of which is shown at 37, Figs. 5 and 7. At the bottom the slides are attached to the ends of a substantial cross-member 38. At the top the slide 37 is equipped with a stud 39 extending laterally through a vertical slot 40 in a sliding plate 41 in which the member 37 is itself fitted to slide. A rod 42, suspended on the stud 39, is encircled by the helical spring 43 the lower end of which bears on an abutment 44 on the bottom of plate 41. It will therefore be seen that the upward thrust of the spring normally holds the lower part of the clamp in the position shown in Fig. 1, but that the said lower part may be depressed independently of the upper, against the tension of the spring, by downward movement of the bar 38. (It will be understood that the parts illustrated in Fig. 5 are duplicated at the other side of the machine.) The bar 38 can be depressed at will, to depress the lower part of the clamp, by means of a treadle 45, Figs. 1 and 2, connected to the bar by a link 46, arms 47, 48, and link 49.

The upper part 35, of the clamp 34, Figs. 1 and 5, is provided with studs 50, extending forwardly into inclined slots 51 in the knife stock 10. When the stock is in its idle or upper position, the studs rest in the lower ends of the slots, the clamp being suspended from the latter; and as the stock descends, the clamp descends also until it is arrested by coming down upon the paper. Thereafter, the knife continues its downward movement, but is given a leftward horizontal component of motion by the inclined slots co-operating with the now stationary studs. This means that a substantial part of the downward pull exerted on the knife is transmitted to the studs and thence to the clamp, thereby holding the latter firmly on the paper, the amount of pressure thus exerted on the paper being determined, in some measure, by the angle of inclination of the slots, as will be readily understood. Heretofore the attempt has been made to increase the pressure exerted on the clamp by the knife by increasing the friction between the two, as by means of a facing of friction material, not shown, on one or the other, but this expedient has not been altogether satisfactory in practise.

In some cases the clamping pressure resulting from action of the studs 50 and slots 51 is sufficient to hold the paper motionless during the cut, but in other cases it may be insufficient and the paper may shift or the sheets may slide on each other. I have accordingly combined with the clamp and knife-stock a mechanism by which a supplementary pressure can be exerted when necessary or desirable, this supplementary pressure being exerted preferably by positive connection with the knife-actuating devices through the medium of a friction clutch which is adapted to slip when the pressure exerted through it exceeds a predetermined amount. For this purpose the slide-bars 41 on each side of the machine (one such bar is shown in Fig. 4) are provided at their lower ends with racks 52 to mesh with gear sectors 53, Fig. 3, fixed on a transverse shaft 54, so that when the shaft is rocked the racks and slide-bars will be drawn down, and with them the clamp, which, it will be remembered, is connected to the upper ends of the bars 41. The shaft 54 is itself rocked in harmony with the movements of the knife and clamp by a friction clutch of the slip type which will now be described.

Figure 8:
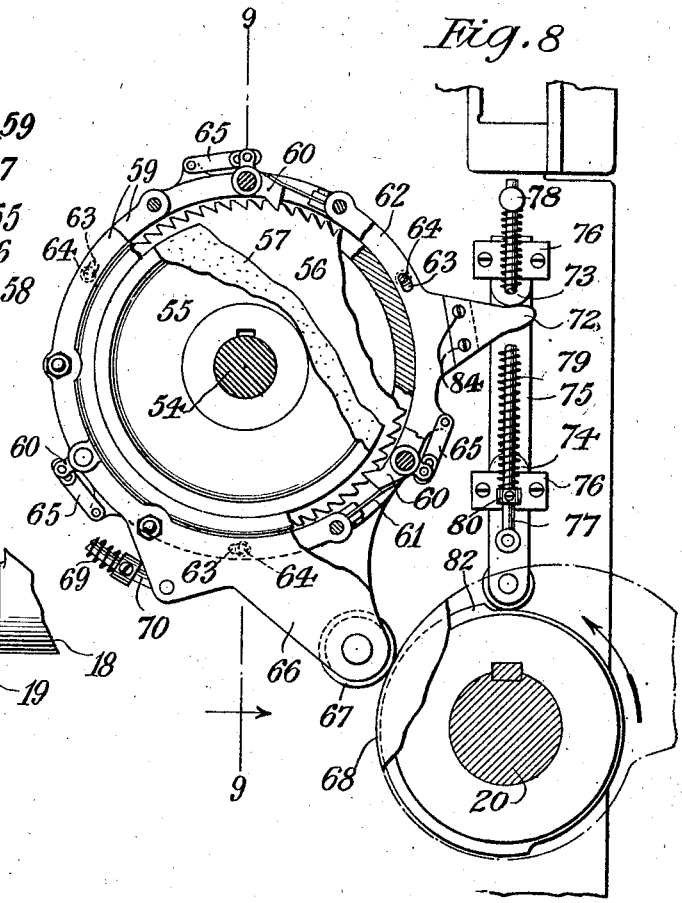
Fig. 8 is a detail side view of the friction clutch and parts by which it is thrown into and out of operation; portions of the clutch being broken away to show the interior elements.
Figure 10:
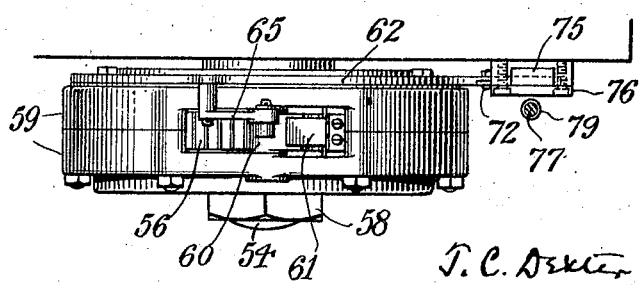
Fig. 10 is a detail plan view of the friction clutch.

The slipping clutch just mentioned is illustrated in Figs. 3, 8, 9 and 10, and as there shown comprises a pair of disks 55 keyed to shaft 54 alongside of one of the sector gears 53, say on the left side of the machine. Between the disks is a friction plate 56, having faces 57 of friction material, and on the outer end of the shaft is a nut 58 by which the three disks 55, 55, 56 can be adjustably clamped together to give any desired frictional engagement and permit the disk 56 to slip on the other two when the resistance offered by the latter exceeds an amount determined by the adjustment of the nut 58, as will be readily understood. The friction disk 56 is formed with ratchet teeth on its edge, as shown in Fig. 8.

Encircling the three disks 55, 55, 56, Figs. 3, 8, 9 and 10, is a two-part ring or annular casing 59 carrying a series of pawls 60, three in number spaced equiangularly apart, adapted to engage the teeth on the disk 56 and urged in that direction by blade springs 61. Mounted on one side of the casing 59 is an annulus or ring 62, connected to the casing by slots 63 and screws 64 so as to have a slight circumferential or rotary sliding movement relative to the casing, and connected to the pawls by means of the slotted links 65. As shown in Fig. 8 the ring 62 has been moved clockwise far enough to permit the springs 61 to bring the pawls 60 into engagement with the ratchet. If now the casing 59 be rocked or rotated clockwise it will carry the friction disk 56 in the same direction and with it the disks 55, shaft 54, and sector gears 53 keyed to the latter, thus drawing down the clamp 34, Fig. 4, until the resistance encountered by the clamp (on the paper), and transmitted back through the racks 52, sectors 53 and shaft 54 to the disks 55, exceeds the friction between the disks 55 and the disk 56. Thereafter, continued movement of the casing 59 and disk 56 causes the latter to slip between the other disks but in such slipping movement the disk 56 evidently continues to exert upon the paper (through the medium of the gear sectors, racks, and clamp) the maximum pressure permitted by the adjustment of nut 58. On the other hand, if the ring 62, controlling the pawls 60, is shifted counterclockwise (Fig. 4) relative to the casing 59 the links 65 will rock the pawls out of engagement with the disk 56, thus entirely disconnecting the casing from the ratchet. The shaft 54 can then be rocked freely in the counterclockwise direction to raise the clamp (disks 55, 55 and 56 turning freely inside of the casing 59) and the casing can be turned with equal freedom to restore it to its initial position. In other words, no power is wasted in overcoming friction between the disks as the clamp is restored to its upper position after the cut is made.

For the purpose of turning the casing 59 clockwise (Figs. 8 and 9) to rotate the friction disk 56 and press the clamp on the paper the casing is provided with an arm 66 having an anti-friction roller 67 bearing on a cam 68 fixed on the shaft 20. See also Fig. 2. This cam is preferably so timed that it will begin to turn the casing just as or after the knife starts down and will permit the casing to swing back (counterclockwise) just after the pawls 60 are disengaged. This counterclockwise movement of the casing is produced by a helical spring 69, Fig. 2, encircling an arc-shaped rod 70 which is fixed on the casing but can move through the stud 71 (fixed on the adjacent frame of the machine) as the casing turns clockwise. It will of course be understood that the rod 70 is concentric with shaft 54. For the purpose of turning the pawl-controlling ring 62, to engage and disengage the pawls, the ring is provided with a finger 72 extending between verticlly spaced shoulders or bosses 73, 74, on a vertically shiftable member 75 mounted on guides 76 fixed on the side frame of the machine. Fixed on the member 75 at the bottom thereof is a vertical rod 77 movable through a stud 78 on the side frame of the machine. The rod is encircled by a spring 79 between said stud and an adjustable collar 80 so that the tension of the spring will hold the roller 81, on the lower end of member 75, in constant engagement with cam 82 on shaft 20. This cam is so timed, preferably, that the slide 75 will move down (under the influence of spring 79) as or shortly after the knife begins its descent. This movement of the slide brings the upper shoulder, 73, into engagement with finger 72 and depresses the same, thereby turning ring 62 and causing the pawls to engage the disk 56 as described above. Whereupon cam 68 rocks the arm 66 and brings finger 72 down into proximity to the lower shoulder, 74. Then about the time the drop on cam 68 comes under arm 66 (after the cut is completed) the cam 82 raises slide 75, carrying shoulder 74 up against the finger 72 and turning the ring 62 counterclockwise, thereby disengaging the pawls as previously explained. The casing 59 and ring 62 are then free to swing counterclockwise to their initial positions under the influence of spring 69. Between ring 62 and casing 59 is a friction ring 83 to prevent the springs 61 from rocking the pawls after they have been disengaged and before the ring has again been turned clockwise by the agency of cam 82.

From the foregoing it will be seen that with the various parts in initial position, the knife and clamp are the first to start, the clamp moving down until arrested by the paper. Thereupon the knife starts to move sidewise as well as downwardly, which puts a positive pressure on the clamp. In the meantime the cam 82, Fig. 2, rocks the ring 62 clockwise and causes the pawls 60 to engage the disk 56. Cam 68 can now, by its engagement with arm 66, rock the shaft 54, and through the medium of sector gears 53 and racks 52, exert an additional pressure of any desired amount upon the clamp according to the adjustment of nut 58. The knife now begins the cut. As soon as the cut is completed, the cam 82 disengages the pawls, thus freeing the clamp from all connection with the clutch, whereupon the clamp can follow the knife in the upward movement of the latter without the waste of power which would be incurred if the clutch had to slip on the up as well as on the down stroke.

It will also be observed that the movement of the friction disk 56 relative to the disks 55 is always in the same direction. This means that all parts of each disk will engage in succession all parts of the contiguous disk, thus distributing the wear uniformly; whereas in a construction in which the disks have relative movement in both directions the wear is more or less localized, so to speak, between the angular limits of such relative movement.

Attention is also called to the uniform spacing of the pawls 60 around the ratchet disk. This arrangement distributes the stresses evenly; whereas with the pawls bunched together the reaction of the driven disks tends to spread them apart at the point where the driving torque is exerted thereby subjecting the outer (driven) disks to bending stresses which may, under heavy overload, cause breakage. In my construction, however, the driving torque is distributed and the bending stresses are thereby reduced to a value within a margin of safety which can be provided without making the parts inordinately heavy.

As previously stated, the clamping pressure due to the combined downward and lateral movement of the knife may in some cases be enough to hold the paper with sufficient firmness. In such case the additional pressure exerted through the friction mechanism would be a waste of power, and accordingly means are provided to disable the friction mechanism. For this purpose the finger 72, Fig. 8, is made removable, being held in place by bolts 84. When the finger is removed after the pawls 60 have been disengaged from the ratchet 56, the member 78 and casing 59 move idly back and forth in the subsequent operation of the machine.

Vertical adjustment of the knife relative to the stock can be conveniently effected by the construction illustrated in Figs. 11, 12 and 13. As shown in Figs. 11 and 12, the lower portion of the stock is provided with a recess 85, closed by a removable coverplate 86 having vertically spaced inwardly extending bosses 87, 88 in which is mounted a threaded stud 89 having a foot 90 adapted to bear upon the upper edge of the knife 30 and extending into a slot 91 in the lower edge of the cover-plate to prevent the stud or shaft from rotating. Between bosses the shaft is embraced by a nut 92 on which is cut a worm gear 93, engaged by a worm 94 journaled in the rear wall of the recess 85 and in the cover-plate 86. Rotating the worm (as by means of a socket wrench applied to the squared rear journal 95) therefore rotates the nut 92; and since the nut cannot move axially and the stud 89 cannot rotate, the movement of the nut shifts the stud up or down, as may be desired. In this way a very fine and accurate adjustment can be made, it being understood that several mechanisms of the kind described are provided, say four or more according to the length of the knife, these mechanisms being suitably spaced across the stock. The upward reaction of the knife is prevented by screws 96, extending into the knife through vertical slots 97 in the lower edge of the stock 10. When by repeated sharpening the knife becomes too narrow for the feet 90 to seat on its upper edge the screws are set in the upper row of holes, 98, and a filler strip 99, Fig. 13, is inserted above the knife, between the same and the feet. The strip may be positioned on the knife by means of dowels, not shown, and may be secured to the knife by vertical screws 100.

It is to be understood that the invention is not limited to the specific construction herein illustrated and described but can be embodied in other forms without departure from its spirit.

I claim:

1. In a paper cutting machine, the combination with a vertically movable knife, of a paper clamp associated with the knife and pressed thereby upon the paper during the cut, driving mechanism, devices connecting the driving mechanism with the knife to actuate the latter, clamp-actuating mechanism for additionally pressing the clamp upon the paper during the cut, and connecting means between said driving mechanism and said additional clamp-actuating mechanism to operate the latter mechanism from the former, said means comprising a rotary driven disk connected with the clamp-actuating mechanism, and a rotary driving disk connected with the driving mechanism and having slipping frictional engagement with the driven disk.

2. In a paper cutting machine, the combination with a vertically movable knife; driving mechanism connected with the knife to actuate the same; a paper clamp connected with the knife to move vertically therewith and give the same a horizontal component of motion when the clamp is seated on the paper, whereby the clamp is pressed upon the paper by the knife during the horizontal and downward movement thereof; and friction-drive mechanism connected directly with the clamp to additionally press the clamp upon the paper while the cut is being made, comprising a rotary driven disk connected with the clamp, a rotary driving disk having slipping frictional engagement with the driven disk to rotate the same, and means directly connected with the driving mechanism to rotate the driving disk.

3. In a paper cutting machine, in combination with an element comprising a vertically and horizontally movable knife-stock and a knife carried thereby; an element comprising a paper clamp movable vertically with the knife; one of said elements having an inclined slot and the other a stud cooperating with the slot to impart a horizontal component of motion to the descending knife-stock and knife when the clamp is seated on the paper; driving mechanism connected with the first element to actuate the same; vertical racks connected with the clamp to exert a downward pull thereon; gears meshing with the racks to actuate the same; a rotary driven disk connected with the gears to actuate the latter; a rotary driving disk having slipping frictional engagement with the driven disk to rotate the same; and an actuating connection between the driving mechanism and said driving disk to rotate the latter.

4. In a paper cutting machine, in combination, a vertically reciprocatory paper clamp, a driven disk connected with the clamp to actuate the same, a driving disk having frictional engagement with the first-named disk to drive the same, means for actuating the driving disk, and means for positively connecting the said driving disk and the actuating means on the down-stroke of the clamp and positively disconnecting them on the up-stroke of the clamp.

5. In a paper cutting machine, in combination, a knife, a paper clamp; a disk connected with the clamp to press the same on the paper; a ratchet disk alongside of and having frictional engagement with the first disk; a circumferentially movable casing encircling the ratchet disk; a pawl carried by the casing and movable into and out of engagement with the ratchet disk; an element carried by the casing and movable relatively thereto to cause engagement and disengagement of the pawl; and cam-actuated devices associated with said casing and said element to actuate the same in harmony with the knife and clamp.

6. In a paper cutting machine, in combination, a knife; a paper clamp; a disk connected with the clamp to press the same on the paper; a ratchet disk alongside of and having frictional engagement with the first disk; a circumferentially reciprocatory casing encircling the ratchet disk; a cam associated with the casing for reciprocating the same in harmony with the knife and clamp; a pawl carried by the casing and movable thereon into and out of engagement with the ratchet disk to operatively connect the casing to the disk; means carried by the casing and movable relatively thereto to cause engagement and disengagement of the pawl; and a cam associated with said means to operate the same in harmony with the knife and clamp.

7. In a paper cutting machine, in combination, a knife; a paper clamp; a disk connected with the clamp to press the same upon the paper; a ratchet disk alongside of and having frictional engagement with the first disk to actuate the same; a circumferentially movable casing concentric with the ratchet disk; a plurality of equiangularly spaced pawls carried by the casing and movable into and out of engagement with the ratchet disk; means for actuating the casing in harmony with the knife and clamp; an element for causing engagement and disengagement of the pawls; and cam-actuated means for shifting said element in harmony with the movement of the casing.

8. In a paper cutting machine, in combination, a paper clamp and friction-drive actuating mechanism therefor; comprising a disk connected with the clamp to press the same on the paper, a ratchet disk alongside of the first disk and having frictional engagement therewith to rotate the same, a circumferentially movable annular casing associated with the ratchet disk, a pawl carried by the casing and shiftable into and out of engagement with the ratchet disk, means for shifting said casing to actuate the ratchet disk when the pawl is engaged therewith, a rotatively shiftable member carried by the casing and connected with the pawl to cause engagement and disengagement thereof, and mechanism for shifting said member to engage and disengage the pawl in harmony with the movement of the casing.

9. In a paper cutting machine, the combination with a vertically movable knife, of a paper clamp associated with the knife and pressed thereby upon the paper during the cut, vertical slide-bars connected with the clamp to additionally press the same upon the paper during the cut, and friction-drive means including a rotary slipping clutch, associated with said slide-bars to actuate the same.

10. In a paper cutting machine, the combination with a vertically movable knife, of a paper clamp associated with the knife and pressed thereby upon the paper during the cut, vertical racks connected with the clamp to additionally press the same upon the paper during the cut, gears engaging the racks to actuate the same, and friction-drive mechanism having a rotary slipping clutch, associated with the gears to rock the same.

In testimony whereof I hereto affix my signature.

TALBOT C. DEXTER.